Figure 1:
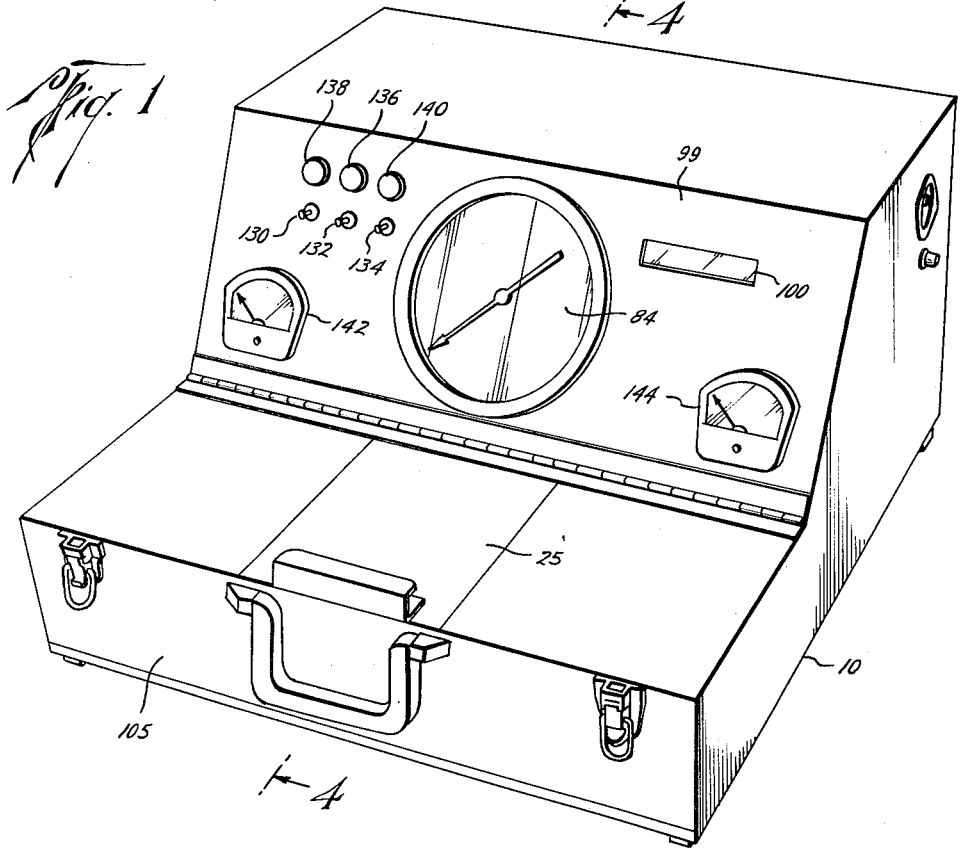

June 19, 1962  J. A. REDDICK  3,039,303
METHOD OF AND APPARATUS FOR MEASURING THE LENGTH OF FIBERS
Filed March 11, 1959  5 Sheets-Sheet 1

John A. Reddick
INVENTOR.

BY
ATTORNEYS

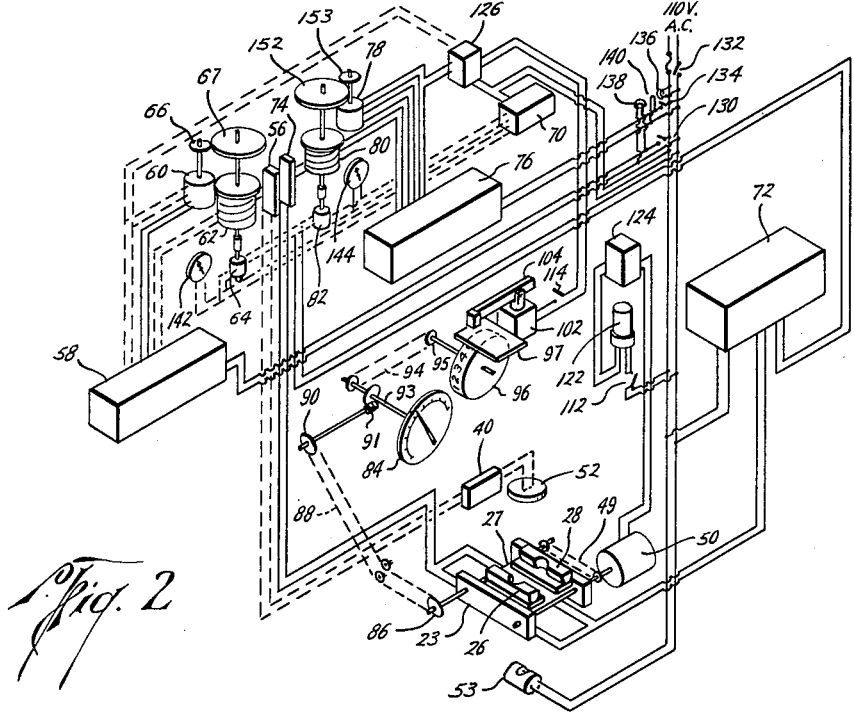

June 19, 1962  J. A. REDDICK  3,039,303
METHOD OF AND APPARATUS FOR MEASURING THE LENGTH OF FIBERS
Filed March 11, 1959  5 Sheets-Sheet 3
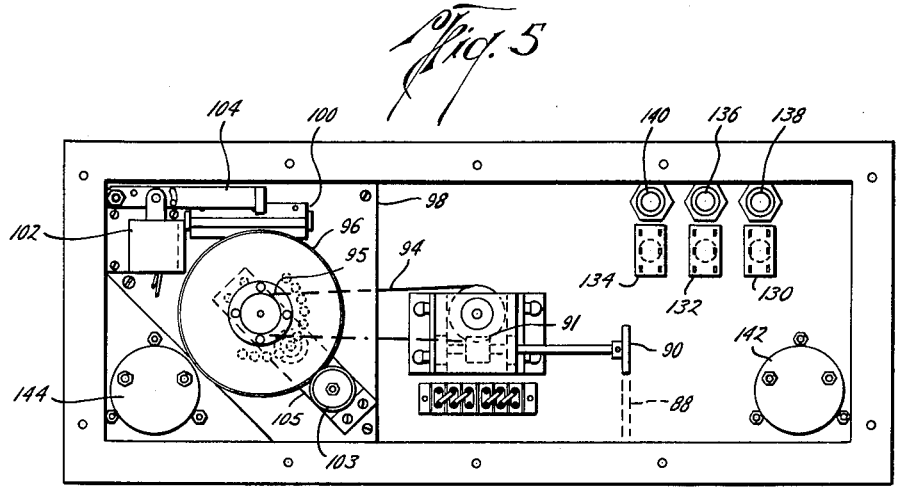
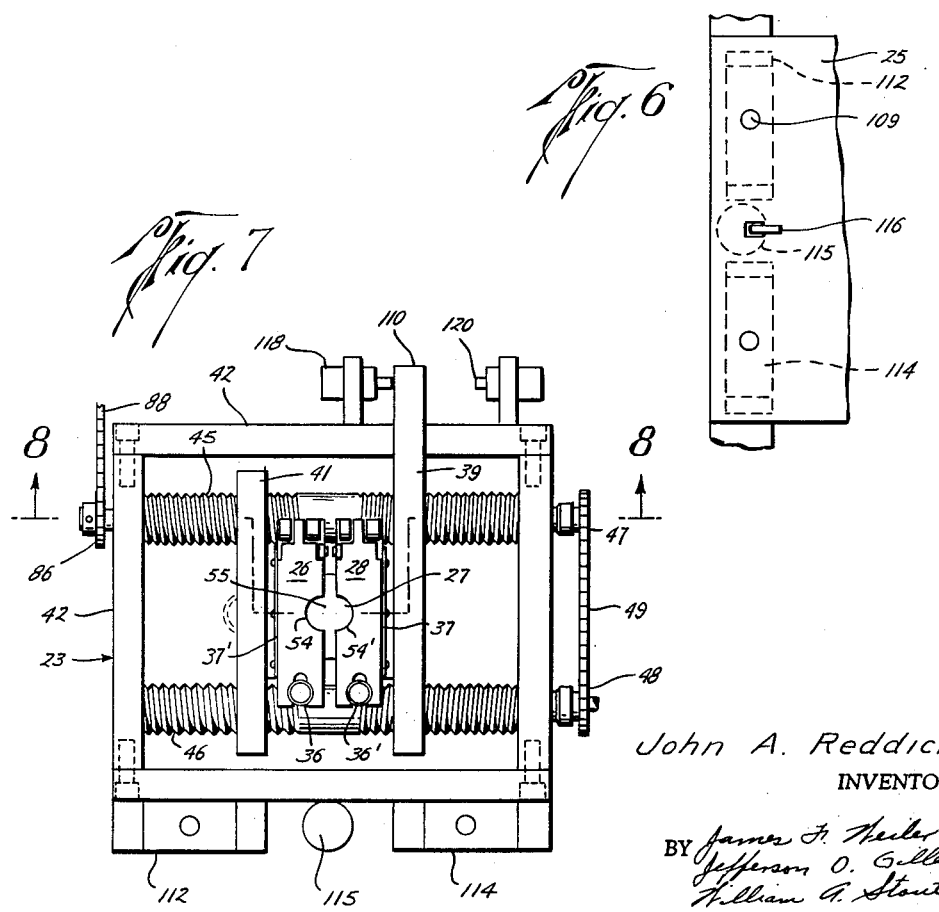
John A. Reddick
INVENTOR.
ATTORNEYS June 19, 1962 J. A. REDDICK 3,039,303
METHOD OF AND APPARATUS FOR MEASURING THE LENGTH OF FIBERS
Filed March 11, 1959 5 Sheets-Sheet 4

John A. Reddick
INVENTOR.

BY James F. Heiler
Jefferson D. Giller
William A. Stout
ATTORNEYS

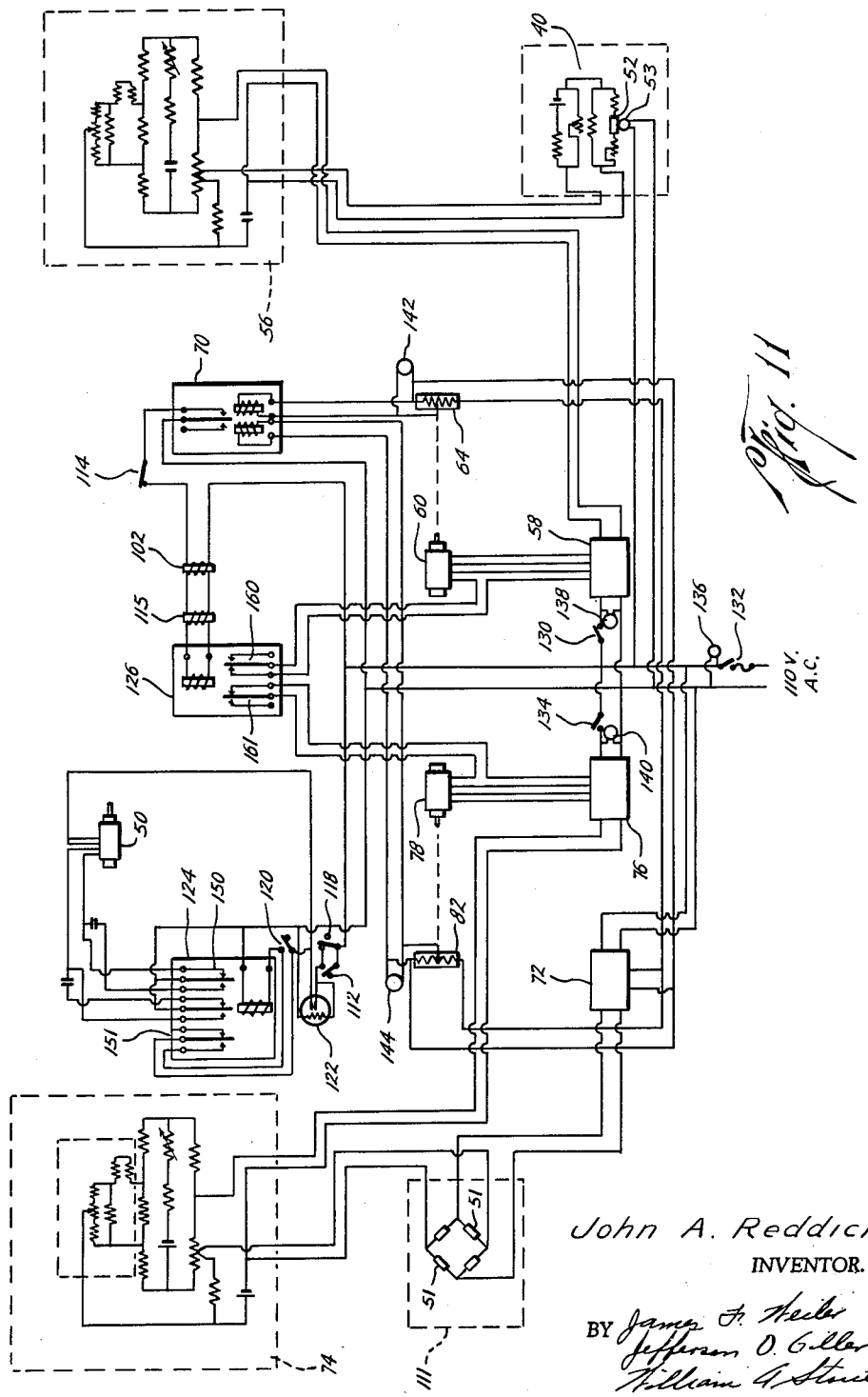

3,039,303
METHOD OF AND APPARATUS FOR MEASURING
THE LENGTH OF FIBERS
John A. Reddick, Houston, Tex., assignor to Anderson, Clayton & Co., Houston, Tex., a corporation of Delaware
Filed Mar. 11, 1959, Ser. No. 798,689
20 Claims. (Cl. 73—159)

The present invention relates to a method of and apparatus for measuring the length of fibers, and more particularly relates to such a method of and apparatus for determining the staple length of fibrous materials such as cotton, wool and man-made synthetic fibers.

While the invention is hereafter discussed with relation to cotton it is to be understood it can be used with other fibers.

As commonly used in the cotton industry the term "staple length" generally means the normal length of a typical portion of fibers of a sample. Because the price of cotton depends largely on the staple length the accuracy of determining this quality is of considerable importance. Despite the invention of a number of instruments in the past to measure the staple length, the industry continues to rely on the judgment of cotton classers for staple length because of the inability of these instruments to economically or accurately determine this quality.

The cotton classer makes a staple determination by taking a sample of cotton in his two hands and holding it firmly between the thumb and forefinger of each hand and he "breaks" or more accurately, pulls the sample apart into two parts of approximately equal weight by overcoming the fiber to fiber friction of the cotton rather than pulling the fibers in two. Usually by the feel of the "break," that is, the force required to overcome the friction between the fibers, the classer is able to obtain a general idea of the staple. However, for a more accurate determination the classer must complete the process by making a typical "pull." In making the "pull" the classer discards the cotton in his right hand and with his free hand extracts a thin layer of fibers from the remaining sample by grasping the ends between the thumb and the forefinger. Additional layers are withdrawn and placed directly over the original layer with care to make sure that the ends of the layers are as even as possible. By repeating this procedure two or three times, an excellent sample can be obtained which is rectangular in shape and of which the staple or length may be measured by laying the sample down on a dark background and measuring the length by eye or with a scale graduated in one thirty-seconds inch increments.

This human operation produces fairly consistent results, but requires years of experience and training, is time consuming, and is expensive. Certain instruments have been developed to determine the staple but these instruments have been too slow for commercial application or have given questionable results. It is to overcome these disadvantages of human operation and previous instruments that the present invention is directed.

It has been found that if uniform size samples of the same staple values will, when subjected to a tension separation test in which the force exerted on the sample is measured and plotted as a function of time during a constant rate of separation, produce the same force-time curve or characteristic. By a tension seperation test is meant a pulling apart of the sample with the separation occurring primarily by overcoming fiber to fiber friction rather than pulling the fibers in two. It has also been found that if uniform size samples of different staple values will, when subjected to the tension separation test just described, produce a family of similarly shaped force-time curves. Recording devices may utilize this information to mechanically prepare the force-time curve of a sample of unknown staple. This curve is then compared with standard force-time curves previously plotted for known staple values to determine the staple value of the tested sample. However, this method is time consuming and expensive, and is subject to the human element in making the comparison.

It is an object of this invention to provide a method of and apparatus for locating a particular determinable point on the force-time curve of samples which point will determine the staple of the sample tested thus eliminating the necessity of attempting to compare an entire force-time curve of a known staple with the entire force-time curve of the sample being tested.

It has been found that if uniform size (both weight and thickness) samples of the same staple value are subjected to the tension separation test previously described while a light source is placed on one side of the sample and the amount of light passing through the sample is measured and plotted as a function of time, the same light-time characteristic or curve will be produced for each sample. It has been found that if uniform size samples of different staple values will produce a family of similarly shaped light-time curves. Further, applicant has discovered that if the light-time curves and force-time curves of each of several samples of different staple values are plotted on the same piece of paper with time as the same coordinate for both curves and the other coordinate indicating both the amount of light and the force, that the light-time curve and force-time curve for each sample intersect at one point and that these points of intersection for different samples fall on a straight line. Because these points fall on a straight line the staple value is indicated by the point at which the force-time and light time curves intersect is directly proportional to time and the staple value may be determined as a direct proportion of time as later explained.

It is important in the tension separation tests as previously mentioned that substantially uniform size samples be used. It has been found that in the case of cotton that a prepared sample such as a card sliver, which is a uniform sized conventionally prepared sample, will give the best results although accurate results may be obtained from raw stock samples prepared by hand.

Therefore, it is a further object of the present invention to provide a method of and apparatus for determining the staple length of a sample of fiber including subjecting the sample to a tension separation test during which test the force on the sample and the amount of light passing through the sample are simultaneously measured as a function of time.

It is a still further object of the present invention to provide a method of and an apparatus for determining the staple length of a sample by subjecting the sample to a tension separation test during which test the force on the sample and the amount of light passing through the sample are simultaneously measured as a function of time; and converting these measurements into signals which when balanced will provide an indication of the staple length of the sample tested.

Yet a still further object of the present invention is the provision of an apparatus for staple determination including an electromechanical apparatus which rapidly and accurately measures the staple length of fibers.

Yet a still further object is the provision of an apparatus to measure the staple length of a cotton sample which includes sample clamping means which simulates the "grip" of the cotton classer's hands.

Yet a further object is the provision of an automatic apparatus for measuring the staple of a fibrous sample which includes printing means for printing the staple measurement on a ticket.

Another object of this invention is the provision of an apparatus for determining the length of a fibrous sample which measures the light passing through a sample being separated under tension, which measures the tension exerted on the sample as a function of time and converts these measurements into signals and solves the relationship between the light and force signals relative to the time thereby determining the length of the sample tested, which prints the results, and which returns the apparatus to its original position in the cycle.

A still further object of this invention is the provision of a method of measuring the staple of a fibrous sample which includes placing a sample between a pair of jaws, separating the jaws at a uniform rate, measuring the force required to separate the sample as a function of time, simultaneously measuring as a function of time the amount of light passing through the sample from a light source on one side of the sample, producing signals proportional to the force and light measurements, balancing said force and light signals, measuring the time required for the signals to become balanced, and converting this time interval into readings directly indicating the staple length of the sample.

Figure 3:
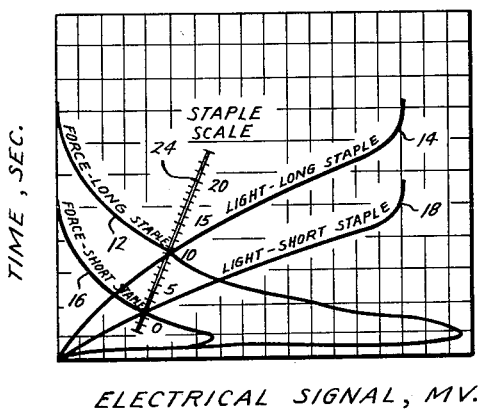
Figure 8:
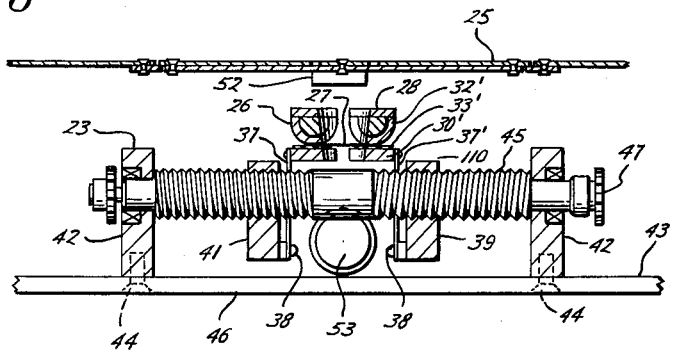
Figure 9:
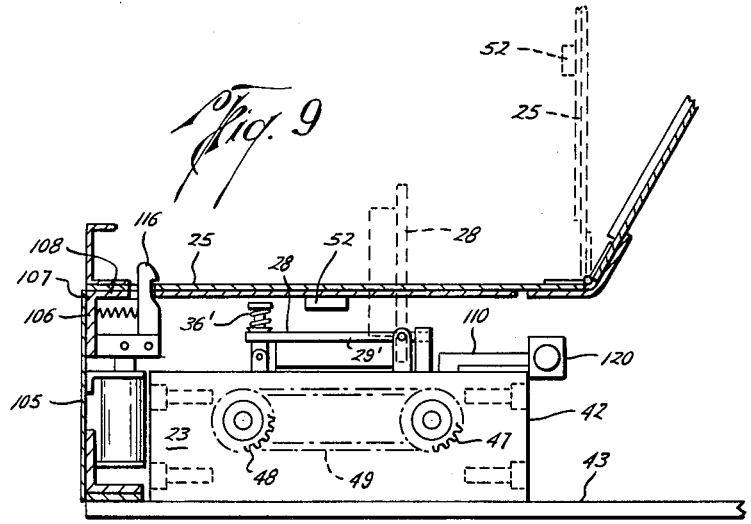
Figure 10:
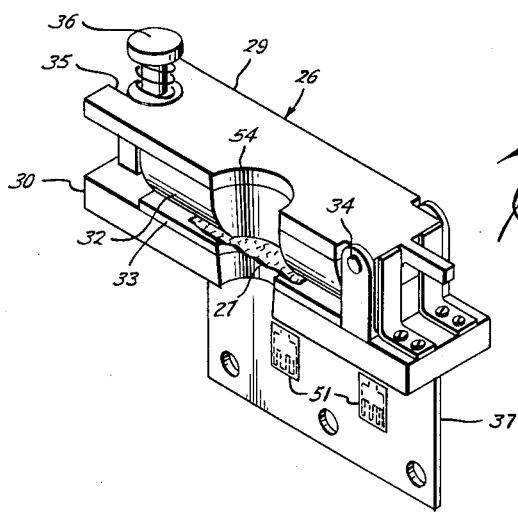

Other and further objects, features and advantages will be apparent from the following description of a presently preferred embodiment of the invention, given for the purpose of disclosure, and taken in conjunction with the accompanying drawings, where like character references designate like parts throughout the several views and where, FIGURE 1 is a perspective view illustrating an apparatus according to the present invention, FIGURE 2 is a diagrammatic representation of the electrical and mechanical components of the present invention, FIGURE 3 is a chart illustrating characteristic curves showing the relationships between the force exerted upon a sample under tension separation test, and the amount of light passing through the sample during the separation test as a function of time for two different staple lengths of samples, FIGURE 4 is a cross-sectional view taken along the line 4—4 of FIGURE 1, FIGURE 5 is a view of the back of the instrument panel of FIGURE 1 showing the printing attachment and dial indexing mechanism, FIGURE 6 is a partial elevational view showing the start cycle and stop cycle switches, FIGURE 7 is a plan view of the jaw assembly illustrating a fiber sample ready for testing, FIGURE 8 is a cross-sectional view taken along the line 8—8 of FIGURE 7, FIGURE 9 is an elevational view of the jaw assembly, FIGURE 10 is an isometric view of one of the jaw holders, and FIGURE 11 is an electrical schematic diagram of the apparatus of the present invention.

Referring now to the drawings, and particularly to FIGURE 3, there is shown a graph with the vertical coordinate as time for a tension separation test and the horizontal coordinate as both the amount of light and the force measured during the tension separation test. The numerals 12 and 16 refer to the force-time curves of substantially uniform size cotton samples subjected to a tension separation test with the numeral 12 indicating the force-time curve of a long staple cotton and the numeral 16 indicating the force-time curve of a short staple cotton. The light-time curves for the same samples are indicated at 14 and 18 for long staple and short staple cotton, respectively. These light-time curves 14 and 18 represent the amount of light passing through the same samples used to obtain the force-time curves 12 and 16, respectively, while the samples are being separated under the tension separation test. While the force-time and light-time curves for only two samples are shown in FIGURE 3 for ease of illustration, the intersection points of the force-time and light-time curves of various staples of uniform size samples fall onto a straight line shown as 24. The line 24 therefore provides a loci of points which are reoccurring and which determine the staple of the sample so measured. It is also to be noted from this graph of FIGURE 3 that this loci of intersection points forming line 24 is a function of time and therefore the staple of a sample will depend upon the length of time required during the tension separation test for the sample to reach the intersection represented by a point on line 24.

Referring to FIGURE 1, the reference numeral 10 generally designates an electromechanical staple determination machine which automatically subjects a fiber sample to the tension separation test while simultaneously measuring the force on the sample and the light passing through it, converts the light and force measurements into electrical signals, electrically compares the signals with each other until they are equal thereby indicating the intersection of the curves and hence the staple of that sample, indicates visually the staple of the sample tested by using a correlated scale, and prints the staple on a ticket.

As best seen in FIGURES 2, 4, 7 and 10 the apparatus or machine 10 includes a jaw assembly 23 in which jaw units 26 and 28 hold a fiber sample 27 and move apart at a uniform rate of speed regardless of the force required to separate the fibers of the sample. Strain gauges 51 (FIGURE 10) attached to the jaw units 26 and 28, measure the force exerted on the sample as the jaw units are moved apart. A light system including a photoelectric cell 52 and a light source 53 are arranged to pass light through, and measure the amount of light passing through, the sample 27 as it is subjected to separation in the jaw assembly 23. Light signals from the photoelectric cell 52 and force signals from the strain gauges 51 are passed through separate servomechanism systems and then compared with each other on a null balance relay 70 (FIGURES 2 and 11). When these signals are equal they correspond to the intersection point of the light-time and force-time curves (FIGURE 3) and the null balance relay 70 actuates a printer solenoid 102 printing the staple number on a ticket. A print wheel 96 and a visual staple indicator 84 are rotated during the tension separation test as a function of time and are correlated with known staple values so as to indicate a staple value of the measured sample. After the null balance relay 70 has been actuated other electrical circuits stop and return the jaw assembly 23 and other parts of the apparatus to their starting position ready for testing another sample.

Beneath the hinged door 25 (FIGURE 1) and as best seen in FIGURES 2, 4, 7, 8, 9 and 10 is the jaw assembly 23 by which a sample of fiber 27 is pulled apart at a constant rate of speed. The jaw assembly 23 includes a pair of jaw units 26 and 28. The jaw unit 26 includes an upper jaw 29 and a lower jaw 30. To better simulate the operation of a classer's hands there is secured to the lower side of the upper jaw 29 a cork cylinder or upper contact member 32 and on the upper side of the lower jaw 30 a flat rubber lower contact member 33 between which upper and lower contact members one end of the fiber sample 27 is held.

In order to place a fiber sample in and remove it from the jaw unit 26, the upper jaw 29 is hingedly secured to the lower jaw 30 by the hinge 34 so that the upper jaw 29 and its upper contact member 32 may be swung vertically as illustrated by the jaw 28 in FIGURE 9. To secure the upper jaw 29 in a closed position as illustrated in FIGURE 10 the free end of the upper jaw 29 is provided with an open ended slot 35 into which fits a spring loaded clamp 36 pivotally secured to the lower jaw 30. The other jaw unit 28 is identically but oppositely constructed and like parts bear the same numbers except they are primed.

The jaw units 26 and 28 are so positioned that the jaws of each jaw unit are parallel to the jaws of the other jaw unit (FIGURE 7). Each jaw unit 26 and 28 is provided with a vertical cut-away portion 54 and 54' respectively passing through the lower jaws 30 and 30', the lower contact members 33 and 33', the upper contact members 32 and 32' and the upper jaws 29 and 29' so as to form a vertical passageway 55 between adjacent sides of the jaw units when the jaw units are in the position illustrated in FIGURE 7.

Secured to the lower jaw 30 of the jaw unit 26 is a vertical flexible plate or mounting spring 37 which spring 37 is secured at its lower end by bolts 38 adjacent the lower side of a horizontal bar shaped jaw support 39 (FIGURES 8 and 10). The jaw unit 28 is similarly mounted on a jaw support 41 with the same parts bearing the same numbers primed.

A rectangular frame 42 is supported horizontally above an instrument base 43 by screws 44. Rotatably secured in the rectangular frame 42 in parallel spaced relationship are a pair of worm screws 45 and 46 with the worm screw 45 passing through threaded openings in one end of each of the jaw supports 39 and 41 and the worm screw 46 passing through threaded openings in the other end of the jaw supports 39 and 41 whereby the jaw supports 39 and 41 are supported by the worm screws 45 and 46 in parallel relationship. The portions of the worm screws 45 and 46 passing through the jaw support 39 have oppositely directed threads to the portions of the same worm screws passing through the jaw support 41 so that upon rotation of the worm screws 45 and 46 in one direction the jaw units 26 and 28 move apart and upon rotation in the other direction they move together. To rotate the worm screws 45 and 46 to a uniform rate of speed the worm screws 45 and 46 are each provided at one end with sprockets 47 and 48, respectively, over which runs a chain 49 (FIGURES 2, 7 and 9) driven by a motor 50 (FIGURES 2 and 11).

To measure the force required to separate a fiber sample by separation of the jaw units 26 and 28 while the fiber sample 27 is held in the jaw units 26 and 28 as illustrated in FIGURES 7 and 8, each of the mounting springs 37 and 37' is provided with a pair of strain gauges 51 (FIGURE 10) secured thereto such as by cementing. Each strain gauge 51 is electrically connected in a Wheatstone bridge circuit 111 (FIGURE 11). On separation of the jaw units 26 and 28 while a fiber sample is clamped between the jaw units, the force necessary to separate the sample causes the mounting springs 37 and 37' to bend and actuate the strain gauges 51 to measure the fiber to fiber friction or separation force exerted on the sample. Strain gauges of the type SR–4, 2000 ohms, from Baldwin-Lima-Hamilton Corp., Waltham, Massachusetts, have been found to be satisfactory.

As best seen in FIGURES 2, 4 and 8 a light source 53 is positioned between and below the jaw units 26 and 28 and is directed upwardly through the opening 55 across which the fiber sample 27 is placed. This light source 53 may be a conventional 110 volt, 60 cycle, 7 watt light. The opening 55 permits the light source to direct light through the sample 27 clamped between the two jaw units 26 and 28 even when the jaw units are in a closed position.

Positioned above and in the center of the jaw units 26 and 28 and attached to the hinge door 25 is the electric photocell 52 which measures the amount of light passing through the sample 27 from the light source 53. A satisfactory photocell has been found to be type A–15 p1 from the International Rectifier Corporation, 1521 East Grande Avenue, El Segundo, California. While the sample 27 is being subjected to a tension separation test the light source 53 and photocell 52 provide and measure the amount of light passing through the sample 27. Since the light and force measurements are taken as the jaw units are separated, and since the jaw units 26 and 28 are separated at a uniform rate of speed the light and force measurements may be recorded either as a function of time or as a function of the separation distance between the jaw units 26 and 28.

The light and force signals from the photocell 52 and the strain gauges 51 respectively, go through a similar sequence, but through separate electrical components, until they supply an opposite but equal voltage signal to a null balance relay which indicates the null or intersection point on the sample's force-time and light-time curves and thus determine the staple of the sample. As best seen in FIGURES 2 and 11, the light signal from the photocell 52 passes through the light circuit resistors 40 and the light range resistors 56, both of which consist of precision wound resistors commercially available and are conventional type circuits. The electrical signal from the light range resistors 56 then passes through the servomechanism circuit consisting of an amplifier 58, the servomotor 60, balancing slide wire 62, and light circuit rheostat 64. The servomotor 60 by means of its transfer gears 66 and 67 positions the slide wire 62 and the rheostat 64 as is conventional in servo systems. Thus the position of the rheostat 64 is determined by and is proportional to the amount of light passing through the sample 27. The light circuit signal is then transmitted from the rheostat 64 to the null balance relay 70 to be compared with the force signal originating from the strain gauges 51.

The following commercial components which are available on the open market have been found satisfactory from Minneapolis-Honeywell Regulator Company of Philadelphia, Pennsylvania the servo amplifier No. 356413, servomotor No. 76750–3, balancing slide wire No. 75893–2; from the Ohmite Manufacturing Company of Skokie, Illinois, the slide wire rheostat No. 0160.

The force on the sample 27 is measured by the four strain gauges 51 mounted on the mounting springs 37 and 37' arranged in a Wheatstone bridge circuit (FIGURE 11), and supplied by a 15 volt D.C. electrical signal from a regulated D.C. power supply 72. An unbalance in the Wheatstone bridge is caused when the jaw units 26 and 28 are separated with a sample secured in them by causing the flexible mounting springs 37 and 37' (FIGURE 10) to bend and change the electrical balance in the strain gauges 51. The force signal goes through a similar sequence, but through separate electrical components, as that described for the light signal (FIGURES 2 and 11). From the Wheatstone bridge connection the force signal passes through the force range resistors 74 and to the force signal amplifier 76 of the same type as the light signal amplifier 58. From the amplifier 76 the force signal is transmitted to a servo system consisting of the servomotor 78, the balancing slide wire 80 and the rheostat 82, all of which are of similar components as those in the previously-described light signal circuit. The force signal is transmitted to the null balance relay 70. When the light and force signals to the null balance relay 70 are equal the null balance relay 70 is energized thereby denoting the intersection or null point between the light and force signals and thus determining the staple of the sample being tested as a function of time.

As previously described the staple length of the measured sample is a function of the time or the distance the jaw units 26 and 28 move during the test until the null point is reached. To provide an indication of the staple a visual indicator 84 is provided which is driven off the sprocket 86 at one end of the worm screw 45 (FIGURE 7). As best seen in FIGURES 2, 4 and 5, a time transfer chain 88 forms the drive linkage between the sprocket 86 to a sprocket 90 which is connected to the visual indicator 84 by means of a worm gear arrangement 91. Since the motor 50 runs at a constant speed, the sprocket 86 and the indicator 84 are rotated at a constant speed. Thus the visual indicator 84 moves as a function of the time involved in separating the jaw units 26 and 28 and may be correlated with known measured samples to provide a scale indicating the staple length of the tested sample.

As best seen in FIGURES 2 and 5 a printing mechanism is provided to print the staple number of the sample on a ticket to obtain an accurate and lasting record of the test. Preferably, the printing mechanism is driven from the drive shaft 93 of the dial indicator 84 by a chain drive 94 and thus is also moved as a function of time. The chain drive 94 drives the sprocket 95 and the print wheel 96. Other components of the printer assembly are mounted upon the printer mounting plate 98 secured to the back of the instrument panel 99 (FIGURE 1) of the staple determination instrument 10. A ticket guide slot 100 (FIGURE 1) extends through the instrument panel 99 so that a ticket 97 may be inserted through the instrument panel to a position above and adjacent to the print wheel 96. A printer solenoid 102, actuated by the null balance relay 70, actuates the printing hammer 104 which prints the staple number on the ticket 97 by striking the ticket 97 against the print wheel 96. Ink roller 103 is positioned adjacent the print wheel 96 to supply ink to the numbers on the wheel.

In order to make the apparatus automatic in operation various switches and relays are provided. The vertical front plate 105 of the apparatus 10 has one flange 106 of an interior angle strip 107 secured to it at its upper edge with another flange 108 extending horizontally to provide a support for the forward end of the hinged door 25. (FIGURES 6 and 9). A normally open contact starting switch 112 is secured to the flange 106 with a plunger 109 projecting through an opening in the flange 108 so that closing the hinged door 25 closes the starting switch 112. A normally open circuit break switch 114 is similarly mounted and actuated. Similarly mounted and between the switches 112 and 114 is a door release solenoid 115 (FIGURES 4, 6 and 9) which when energized opens a latch 116 to release the hinged door 25. As best seen in FIGURE 7 limit switches 118 and 120 are provided on the frame 42 and are alternately contacted and actuated by movement of an extension 110 from the jaw support 39 so as to limit the maximum and minimum opening of the jaw units 26 and 28.

Switches 112, 114, 118 and 120 are commercially available as type 9007 AO–2 from Micro Switch Company, a division of Minneapolis-Honeywell Regulator Company.

Referring now to FIGURES 2 and 11, the electrical connections for a cycle start relay 122, a jaw relay 124, and a cycle stop relay 126 may be seen. Relay 122 may be of the type 115 NO–2 and relay 124 may be of the type KRP 14A and the stop cycle relay 126 may be of the type KRP 11A, all available from Potter and Brumfield of Princeton, Indiana.

As best seen in FIGURES 1, 2 and 11, power switches 130, 132 and 134 are off-on power switches controlling a 110 volt A.C. power to the light amplifier 58, to the main power line and to force amplifier 76, respectively. Also, indicating lights may be provided such as light 136 showing whether the main power is on, and lights 138 and 140 indicating whether the power is on to the light amplifier 58 and the force amplifier 76, respectively. Also indicating volt meters may be provided such as light voltmeter 142 and force voltmeter 144 measuring the amount of voltage of the light and force signals, respectively, which are being transmitted to the null balance relay 70.

Thus a self contained portable staple determination machine is provided which needs only a 110 volt energy source to begin operations.

Before the staple determination apparatus 10 is ready to measure the staple of the cotton the apparatus must be calibrated. To do this marks are made upon the periphery of the printing wheel by the hammer 104 as several samples of uniform size and thickness and of known staple value are placed in the jaw units 26 and 28 and tests are run as later described. The problem then is to convert these marks indicated on the printing wheel 96 to the accepted scale of staple values. The accepted scale of staple values for the number 1 is a 13/16 of an inch long staple of cotton with the scale increasing one number for each additional 32nd of an inch of the length of staple. Assuming that the known staple of the first sample used in calibration is 13/16 of an inch or scale number 1, of the second sample is 15/16 of an inch or scale number 3, and of the last sample 1½ inches or scale number 23, then a printing tape is prepared that will have the numbers 1 and 23 spaced linearly at the same distance apart as the marks on the print wheel 96 that were recorded for the first and last samples. Because the line 24 in FIGURE 3 is a straight line then the linear distance between Nos. 1 and 23 is divided into 22 equally spaced and numbered increments each number indicating the staple value of the samples thereafter tested. This tape is then placed on the printing wheel 96 so that the number 1 is in the same position as the number indicated by the first sample and the number 23 indicated by the last sample. Of course, the apparatus may be calibrated with other types of fiber length measurements.

The dial indicator 84 is similarly calibrated by marking the face of the dial at the same time that the hammer 104 is actuated and then preparing a face plate.

In use, after the staple determination machine 10 has been calibrated and connected to an electrical power source the power switches 130, 132, 134 on the instrument panel 99 are turned on energizing the main power lines (FIGURE 11), the light amplifier 58, the force amplifier 76, the light source 53 and the regulated D.C. power supply 72. A ticket 97 is placed in the ticket holder 100 (FIGURE 1) and is thus positioned adjacent the printing wheel 96 (FIGURES 2 and 5). At this time the jaw units 26 and 28 are in the starting position which is the position where they are nearest each other (FIGURE 7). The operator opens the hinged door 25 and the upper jaws 29 and 29′ thereby gripping the cotton sample 27 between the jaw units 26 and 28. At this same time the normally closed limit switch 118 (FIGURES 7 and 11) is held open by the extension 110 which is attached to and moves with the jaw support 39.

The operator then closes the hinged door 25 which is locked in place by the door latch 116 (FIGURE 4). Closing the hinge door 25 places the photocell 52 directly over the sample 27 and closes the circuit break switch 114. It also closes the starting switch 112 which energizes the cycle start relay 112 which in turn energizes the jaw drive motor 50 through a contact 150 (FIGURE 11) of the jaw relay 124, which jaw relay 124 is not energized at this time. The motor 50 rotates the worm screws 45 and 46 and because the jaw relay 124 is not energized the worm screws 45 and 46 are rotated in the direction moving the jaw units 26 and 28 apart at a uniform rate. Extension 110 allows limit switch 110 to close locking in relay 122 as the jaw units separate. Tension is now taken on the sample 27 by the jaw units 26 and 28 separating causing the mounting springs 37 and 37′ (FIGURES 8 and 10) to bend thereby subjecting the strain gauge 51, comprising the Wheatstone circuit 111 (FIGURE 11), to a strain causing an electrical unbalance in the Wheatstone bridge circuit 111 and thus providing a force measurement of the force exerted upon the sample 27. Since the jaws 26 and 28 simulate the classer's fingers, the sample will separate, the longer fingers being pulled through one of the jaws, and the force measured will be a measure of the fiber to fiber friction.

The force signal from the Wheatstone bridge circuit 111 goes through the range resistors 74 and then to the servomechanism system consisting of the amplifier 76 and servomotor 78, which drives slide wire 80 and rheostat 82. The operation of this servomechanism is to amplify the force or error signal and place it on the rheostat 82 so that it might be transmitted to the null balance relay 70 (FIGURES 2 and 11). The force circuit thereby supplies a voltage signal to the null balance relay that is proportional to the force exerted on the sample 27 at any time. This voltage is also indicated upon the instrument panel 99 by the voltmeter 144 (FIGURES 1, 2 and 11).

Simultaneously during the tension separation test, light from the light source 53 (FIGURES 2, 4, 8 and 11), is passed through the sample 27 and picked up by the photocell 52 directly above the sample 27. The amount of light passing through the sample 27 and striking the photocell 52 is transmitted as an electrical signal through the circuit resistors 40, the range resistors 56 and to the light servomechanism circuit consisting of the amplifier 58 and the servomotor 60 which drives slide wire 62 and the light rheostat 64. As is conventional, the slide wire 62 provides the error signal necessary for the operation of the servomechanism system. Similar to the force circuit the rheostat 64 transmits a voltage signal to the null balance relay 70 which is proportional to the amount of light passing through the sample 27 at any time. This voltage is indicated on the instrument panel 99 by the volt meter 142 (FIGURES 1, 2 and 11).

As best seen in FIGURE 11 a 20 volt D.C. electrical signal from the regulated D.C. power supply 72 is connected to the light rheostat 64 and the force rheostat 82 to provide the signals from these rheostats, which have been positioned by their respective servomotors 60 and 78 through the transfer gears 66 and 67 and 152 and 153, respectively, in a direct shaft hookup. The rheostats 64 and 82 transmit their respective signals to the null balance relay 70 by electrical circuits between the rheostats and the null balance relay.

The null balance relay 70 is a double coil normally open polarized relay, closing when two opposite polarity signals of equal strength, here arranged so that the light signal is positive and the force signal is negative, are fed into the coils. Thus when the light and force signals are equal, indicating the intersection point of the force and light curves of the sample, which is determinative of the staple of the measured sample, the null balance relay 70 closes actuating the stop cycle relay 126, actuates the ticket printing solenoid 102 thereby printing the staple number on the ticket 97, and energizes the door release solenoid 115 to release the hinged door 25 which then opens automatically. The stop cycle relay 126 when energized disconnects and resets both the light and force servomechanism systems through the contacts 160 and 161, respectively. The jaw units 26 and 28 continue to separate until limit switch 120 (FIGURES 7 and 11) is closed by the extension 110 thereby actuating jaw relay 124 which is then held open by its interlock through contact 151 and which reverses the rotation of the jaw motor 50. Limit switch 120 opens with no effect on the circuit. When the jaws reach the starting position, jaw extension 110 opens limit switch 118 which de-energizese relay 124 and stops the motor 50. The separated sample ends may be removed from the jaws and the printed ticket may be removed from the ticket holder and the cycle is completed. The total elapsed time for one complete cycle is approximately 10 seconds.

The above described apparatus provides electromechanical means to measure the staple of a fibrous sample rapidly, accurately, and free of human estimations by automatically finding a determinable recurring point on the force-time characteristics of a sample, and indicating the results on a visual dial and printing the results on a ticket.

It is believed that the method of the invention is apparent from the foregoing description of a presently preferred apparatus of the invention. The method, however, comprises the steps of subjecting a sample to be measured to a tension test wherein the sample is subjected to a force separating the fibers, measuring the force as a function of time, simultaneously passing a light through the sample and measuring the amount of light passing through the sample as it is being separated as a function of time, and converting the amount of time required for the measurements to become equal into a direct reading of the length of the measured sample. The method also comprehends taking the force and time measurements as a function of the distance the jaws move during the test whereby the staple of an unknown sample may be determined as a function of the distance the jaws move for the measured sample's light and force characteristics to intersect. The method further comprehends providing signals proportional to the force and light measurements which when equal will provide an indication of the staple of the measured sample which will be a function of the time required or the distance the jaws move for the signals to obtain balance.

The present invention, therefore, is well adapted to carry out the objects and attain the ends and advantages mentioned as well as others inherent therein. While a presently preferred embodiment of the invention is given for the prupose of disclosure, numerous changes in the details of construction, arrangement of parts and steps of the process may be made which will readily suggest themselves to those skilled in the art and which are encompassed within the spirit of the invention and the scope of the appended claims.

What is claimed is:

1. An apparatus for measuring the length of fibers in a fibrous sample comprising sample separating means holding and separating the sample at a uniform speed, force signal means connected to said sample separating means producing a signal proportional to the force exerted on the sample while it is being separated in the separating means, a light source on one side of said sample adjacent said separating means and adapted to pass light through the sample while it is being separated in the separating means, a light responsive means on a second side and adjacent the separating means adapted to produce a signal in response to the amount of light passing through said sample, means for converting the light and force signals into a common signal, means connected to the force signal means and the light responsive means determining when the common signals from the force signal means and the light responsive means are equal, and time responsive indicating means connected to said last named means indicating the length of the fiber in the measured sample.

2. An apparatus for measuring the staple length of a fibrous sample comprising separating means for exerting tension on the sample and separating the sample at a uniform speed, force measuring means attached to the separating means for measuring the force exerted on the sample and producing a signal in response to said force, light means adjacent said sample passing light through the sample and producing a signal in response to the amount of light passing through the sample, means for converting the light and force signals into common signals, measuring means operatively connected to said light means and forcing measuring means determining when the common signals are equal, and time responsive staple length indicating means connected to the measuring means indicating the staple length of the sample when the common signals are equal.

3. The invention of claim 2 wherein the staple length indicating means includes a visual indicating meter.

4. The invention of claim 2 wherein the staple length indicating means includes printing means for printing the staple determination.

5. The invention of claim 2 wherein the light means includes a light source and photoelectric cell.

6. The invention of claim 1 wherein the measuring means includes two servomotors and a null balance relay.

7. The invention of claim 2 wherein the separating means includes a pair of jaws mounted on at least one worm gear having oppositely directed threads at each end and motor means operatively connected to said worm gear.

8. An apparatus for measuring the length of fibers in a fibrous sample comprising a pair of jaws constructed and arranged to hold a fibrous sample between said jaws, means connected to at least one of said jaws for moving said jaws apart at a uniform rate relative to each other, a strain gauge attached to at least one of said jaws thereby measuring the tension force exerted on the sample and producing an electrical signal proportional to said force, a light source positioned on one side of the sample when the sample, is held between the jaws, a photoelectric cell positioned on the other side of the sample relative to the light source thereby measuring and producing an electrical signal proportional to the amount of light passing through the sample, a null balancing circuit receiving output signals from the photoelectric cell and the strain gauge and arranged to determine when said signals are equal, and time responsive indicating means connected to the null balancing circuit indicating the length of the fiber in the measured sample.

9. The invention of claim 8 wherein the indicating means include a printing mechanism printing the length of the fibers on a ticket.

10. The invention of claim 8 wherein the null balancing circuit includes a servomechanism system for each output signal and a null balance relay electrically connected to each servomechanism.

11. The invention of claim 8 wherein the means for moving said jaws include two worm gears having oppositely directed threads at each end and motor means operatively connected to said worm gears.

12. The invention of claim 8 wherein the jaws include a cork and a rubber gripping surface for holding the sample.

13. An automatic apparatus for measuring the staple length of a fibrous sample comprising a pair of jaws constructed and arranged to hold a fibrous sample between said jaws, means connected to at least one of said jaws for moving said jaws apart relative to each other at a constant speed, a strain gauge attched to one of said jaws thereby measuring the force exerted on the sample, a cycle start relay electrically connected to an electrical source and to the means for moving the jaws, a light source positioned on one side of the sample when the sample is held between the jaws and arranged and constructed to pass light through the sample, a photoelectric cell positioned on the other side of the sample relative to the light source thereby measuring the amount of light passing through the sample, servomechanism means connected to the photoelectric cell and the strain gauge, a null balance relay connected to said servomechanism means whereby the relay is actuated when the output signals from each servomechanism means is equal, measuring means connected to said null balance relay indicating the staple length of the fiber sample when the output signals are equal, a cycle stop circuit electrically connected to the null balance relay and to the means for moving the jaws, said circuit arranged to move the jaws toward each other, and a limit switch positioned adjacent one of said jaws and arranged to stop the movement of said jaws when the original position is reached.

14. The invention of claim 13 wherein the measuring means include a drive mechanism connected to one of the jaws, a ticket printer assembly operatively connected to said drive mechanism, and a ticket printing relay electrically connected to the null balance relay and arranged to be actuated by the null balance relay.

15. The invention of claim 13 wherein the means for moving said jaws include two worm gears having oppositely directed threads at each end and constant speed electric motor means arranged to drive said worm gears.

16. In a method of measuring the length of fibers in a fibrous sample the improvement comprising placing a sample between a pair of jaws, frictionally gripping spaced portions of the sample by said jaws, separating the jaws at a constant speed, measuring the force required to separate the jaws, placing a light source on one side of the sample, measuring the light passing through the sample as the jaws are being separated, simultaneously producing common signals proportional to said force and light measurements, balancing said signals against each other, and measuring the time period between initiating the separation of said sample and such time when the force and light signals are equal, thereby indicating the length of the fibers in a measured sample when said common signals are equal.

17. A method of measuring the staple length of a fibrous sample comprising subjecting said sample to a separation test in which the sample is subjected to a force separating said sample, measuring said force, simultaneously passing light through the sample, measuring the amount of light passing through said sample as it is being separated, producing signals proportional to the force exerted on said sample and to the amount of light passing through said sample, converting light and force signals into a common signal, balancing said common light and force signals against each other, and measuring the time period between initiating the separation of said sample and such time when the force and light signals are equal, thereby indicating the staple length of the measured sample.

18. A method of measuring the length of fibers in a fibrous sample comprising placing the sample between a pair of jaws, separating the jaws at a constant speed measuring the force required to separate the sample, placing a light source on one side of the sample and passing light through the sample as it is being separated, measuring the amount of light passing through the sample as the sample is separated, producing signals proportional to the force and light measurements, converting said light and force signals into common signals, and comparing said light and force signals with each other, and measuring the time period between initiating the separation of said sample and such time when the force and light signals are equal, thereby indicating the length of the measured sample.

19. A method of measuring the length of fibers in a fibrous sample comprising, separating the sample, producing a signal proportional to the force separating the sample, passing light through the sample as it is being separated, producing a signal proportional to the amount of light passing through the sample as it is being separated, converting the light and force signals into a common signal, and balancing the light and force signals against each other, and measuring the time period between initiating the separation of said sample and such time when the force and light signals are equal, thereby indicating the length of the fibers in a sample when said signals are equal.

20. A method of measuring the length of fibers in a fibrous sample comprising, separating the sample at a uniform speed, producing an electrical signal proportional to the force separating the sample, passing light through the sample as it is being separated, producing an electrical signal proportional to the amount of light passing through the sample as it is being separated, and balancing the electrical light and force signals against each other, and measuring the time period between initiating the separation of said sample and such time when the force and light signals are equal, thereby indicating the length of the fibers in a sample when said signals are equal.

References Cited in the file of this patent

UNITED STATES PATENTS

| | | |
|---|---|---|
| 2,299,983 | Hertel | Oct. 27, 1942 |
| 2,659,232 | Lubahn | Nov. 17, 1953 |
| 2,660,889 | Hoisington | Dec. 1, 1953 |